(12) United States Patent
Haveman

(10) Patent No.: US 9,799,134 B2
(45) Date of Patent: Oct. 24, 2017

(54) METHOD AND SYSTEM FOR HIGH-PERFORMANCE REAL-TIME ADJUSTMENT OF ONE OR MORE ELEMENTS IN A PLAYING VIDEO, INTERACTIVE 360° CONTENT OR IMAGE

(71) Applicant: INDG, Amsterdam (NL)

(72) Inventor: Daniel Haveman, Koog aan de Zaan (NL)

( * ) Notice: Subject to any disclaimer, the term of this patent is extended or adjusted under 35 U.S.C. 154(b) by 0 days.

(21) Appl. No.: 15/403,322

(22) Filed: Jan. 11, 2017

(65) Prior Publication Data

US 2017/0200302 A1 Jul. 13, 2017

Related U.S. Application Data

(60) Provisional application No. 62/277,609, filed on Jan. 12, 2016.

(51) Int. Cl.
*G06T 15/00* (2011.01)
*G06T 15/20* (2011.01)
(Continued)

(52) U.S. Cl.
CPC ............ *G06T 15/005* (2013.01); *G06T 15/04* (2013.01); *G06T 15/06* (2013.01); *G06T 15/405* (2013.01);
(Continued)

(58) Field of Classification Search
CPC combination set(s) only.
See application file for complete search history.

(56) References Cited

U.S. PATENT DOCUMENTS 7,336,277 B1 2/2008 Clark et al.
2005/0231511 A1* 10/2005 Doepke ................ G11B 27/034
345/473
(Continued)

FOREIGN PATENT DOCUMENTS

WO WO 2015/153165 10/2015

OTHER PUBLICATIONS

International Search Report—PCT/IB2017/000070 (corresponding to U.S. Appl. No. 15/403,322).
(Continued)

*Primary Examiner* — Wesner Sajous
(74) *Attorney, Agent, or Firm* — Lawrence B. Goodwin, P.C.

(57) ABSTRACT

A method and system for high-performance real-time adjustment of colors and patterns on one or more pre-selected elements in a playing video, interactive 360° content, or other image, using graphics processing unit ("GPU") shader code to process the asset per-pixel and blend in a target color or pattern based on prepared masks and special metadata lookup tables encoded visually in the video file. The method and system can generate asset-specific optimized GPU code that is generated from templates. Pixels are blended into the target asset using the source image for shadows and highlights, one or more masks, and various metadata lookup-tables, such as a texture lookup-table that allows for changing or adding patterns, z-depth to displace parts of the image, or normals to calculate light reflection and refraction.

24 Claims, 17 Drawing Sheets
(11 of 17 Drawing Sheet(s) Filed in Color)

(51) Int. Cl.

| | | |
|---|---|---|
| *G09G 5/02* | (2006.01) | |
| *G09G 5/06* | (2006.01) | |
| *H04N 1/60* | (2006.01) | |
| *H04N 9/73* | (2006.01) | |
| *G06T 15/80* | (2011.01) | |
| *G06T 15/40* | (2011.01) | |
| *G06T 15/06* | (2011.01) | |
| *G06T 15/04* | (2011.01) | |
| *G06T 19/20* | (2011.01) | |
| *G06T 15/60* | (2006.01) | |

(52) U.S. Cl.
CPC .............. *G06T 15/60* (2013.01); *G06T 15/80* (2013.01); *G06T 19/20* (2013.01); *G06T 2219/2012* (2013.01)

(56) References Cited

U.S. PATENT DOCUMENTS

| | | | |
|---|---|---|---|
| 2007/0073776 A1* | 3/2007 | Kalalian | G06F 17/30274 |
| 2009/0021513 A1 | 1/2009 | Joshi et al. | |
| 2012/0169742 A1* | 7/2012 | Baxter | G06T 15/005 345/501 |
| 2012/0210232 A1* | 8/2012 | Wang | G11B 27/034 715/723 |
| 2013/0125000 A1* | 5/2013 | Fleischhauer | G11B 27/031 715/723 |
| 2013/0127889 A1 | 5/2013 | Winnemoeller et al. | |

OTHER PUBLICATIONS

Written Opinion of the International Searching Authority—PCT/IB2017/000070 (corresponding to U.S. Appl. No. 15/403,322).

\* cited by examiner

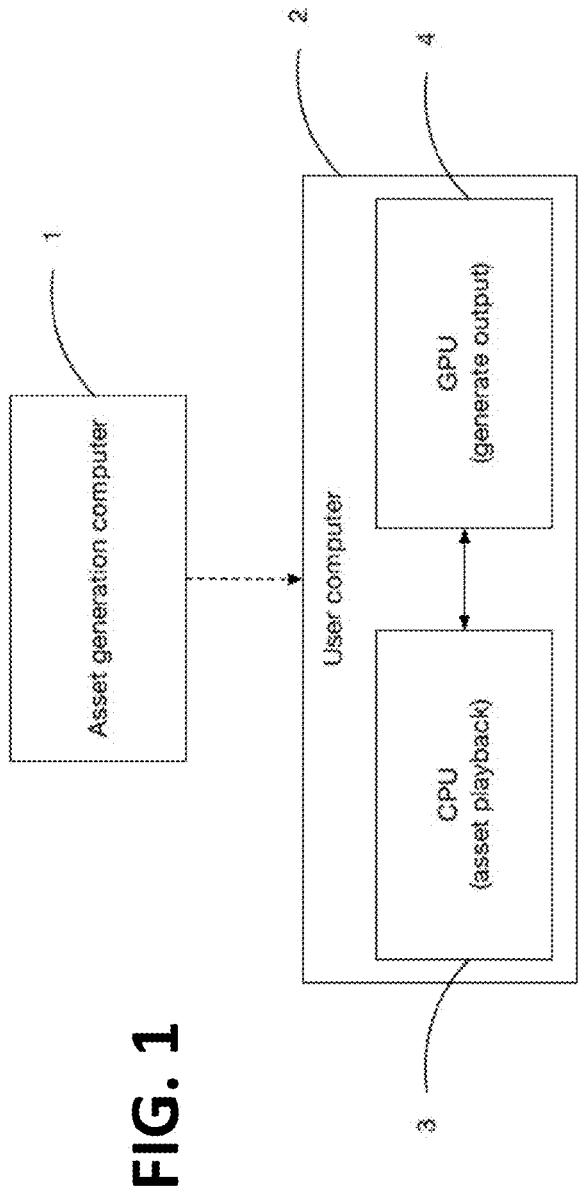
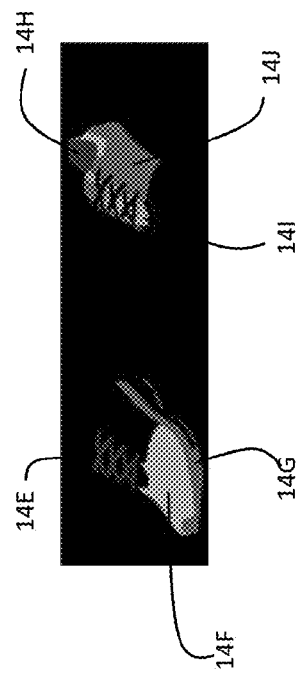
FIG. 1
FIG. 2C

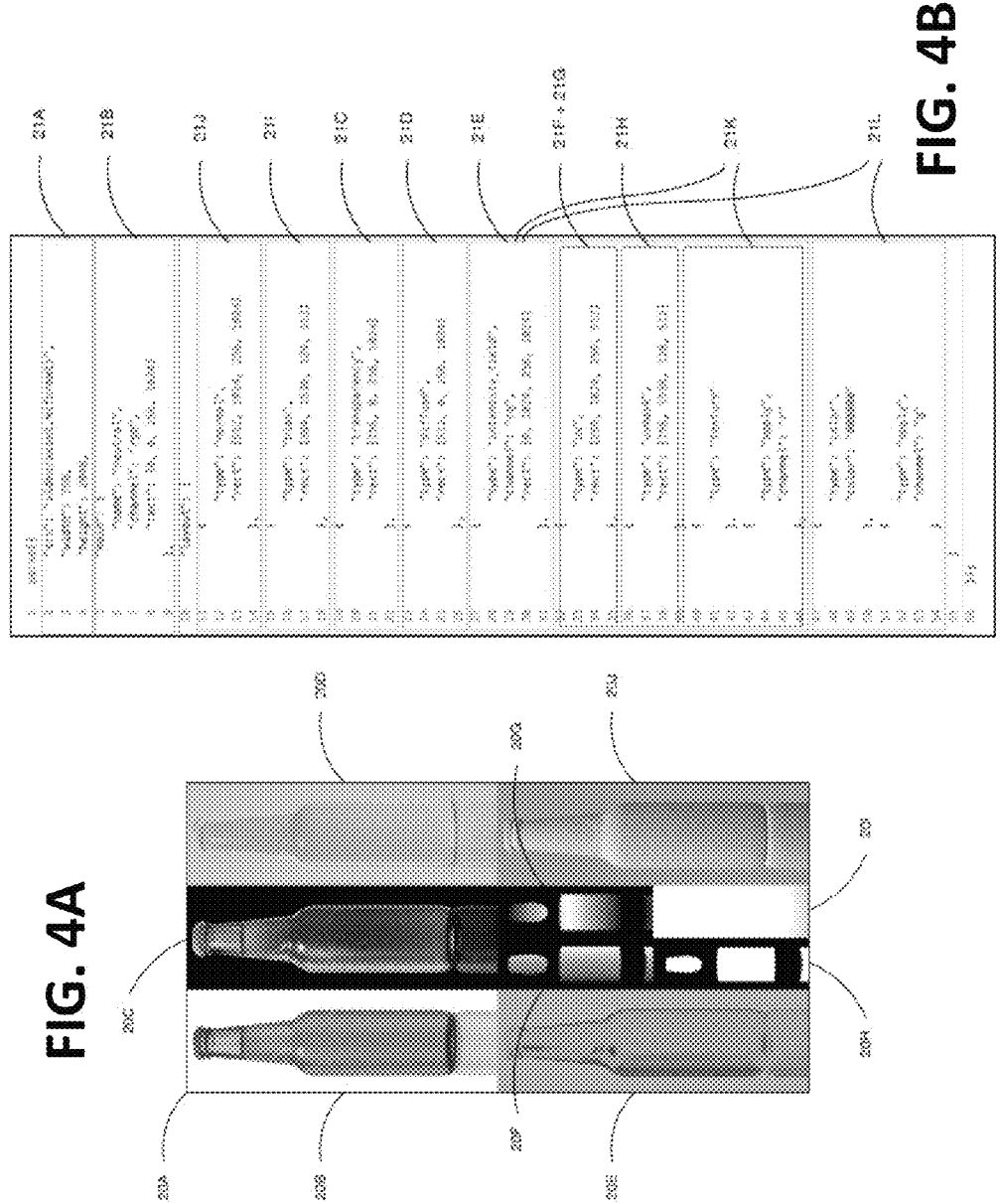

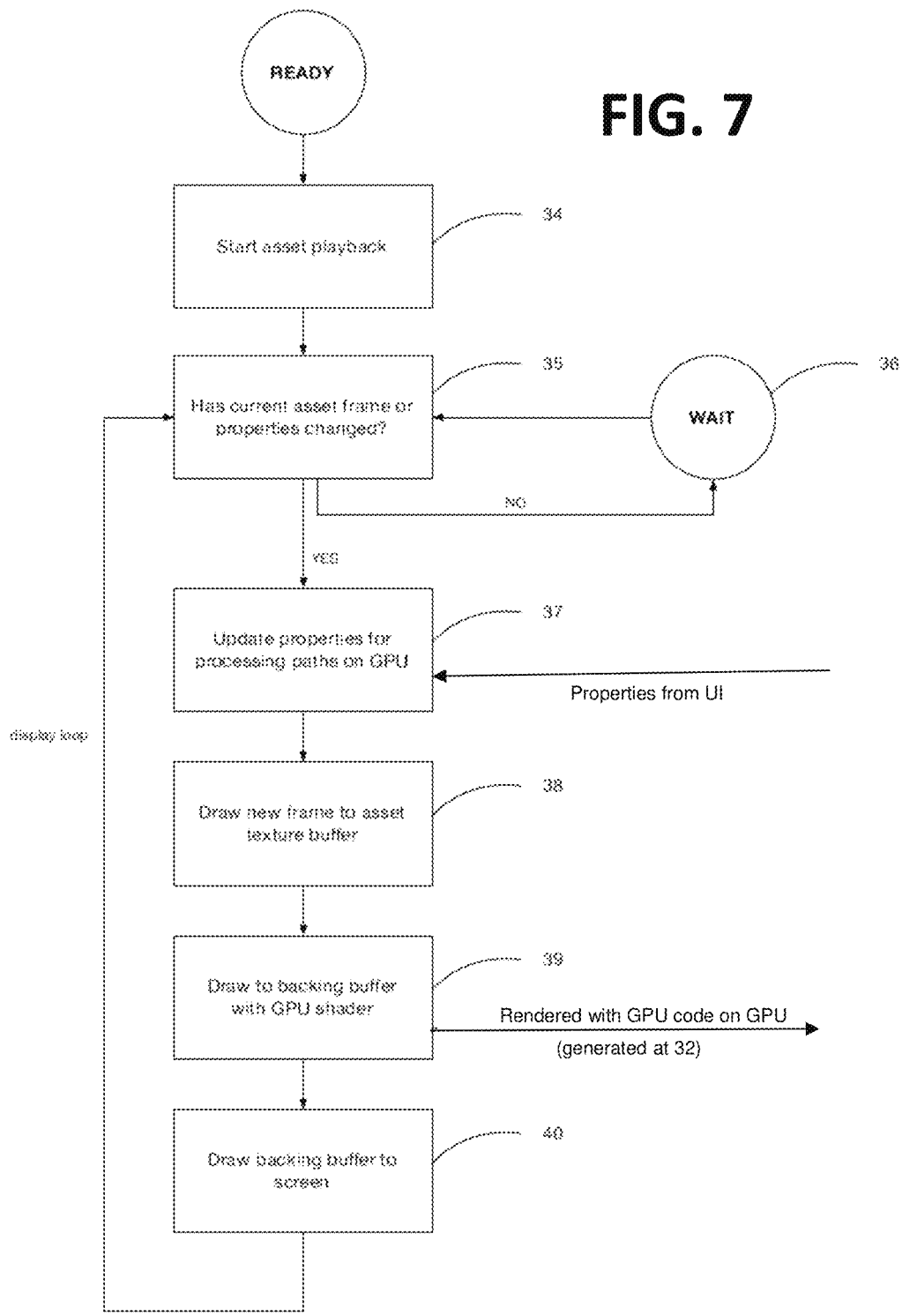

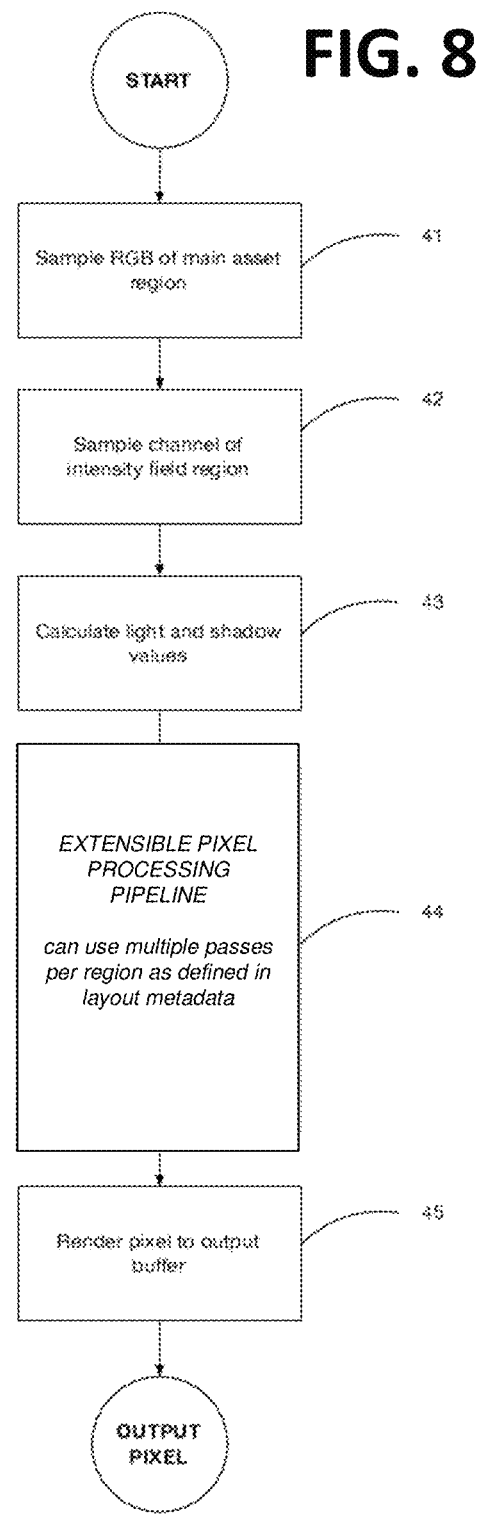

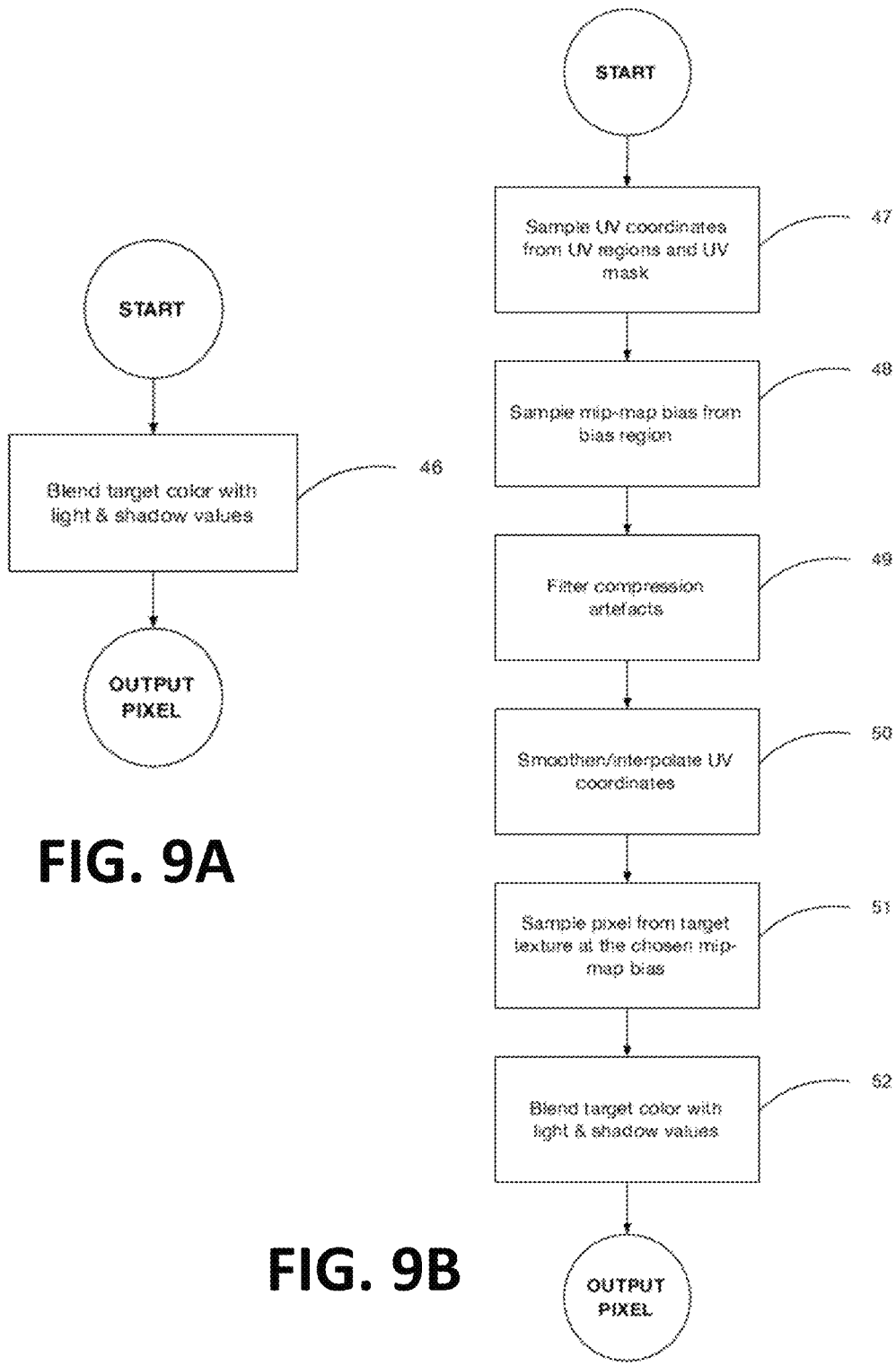

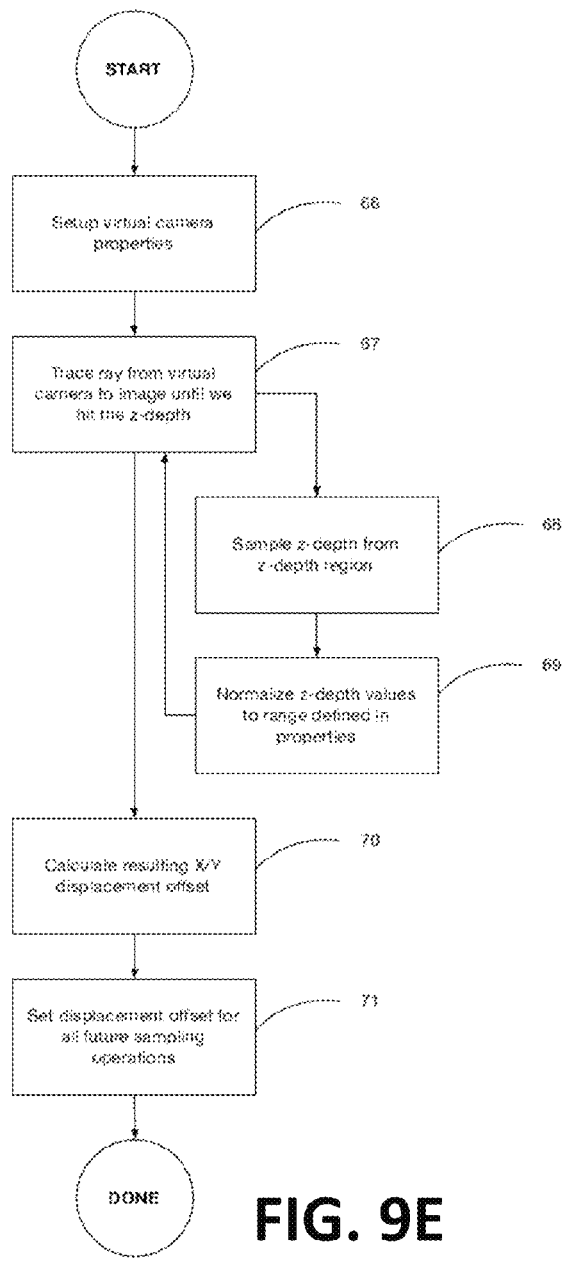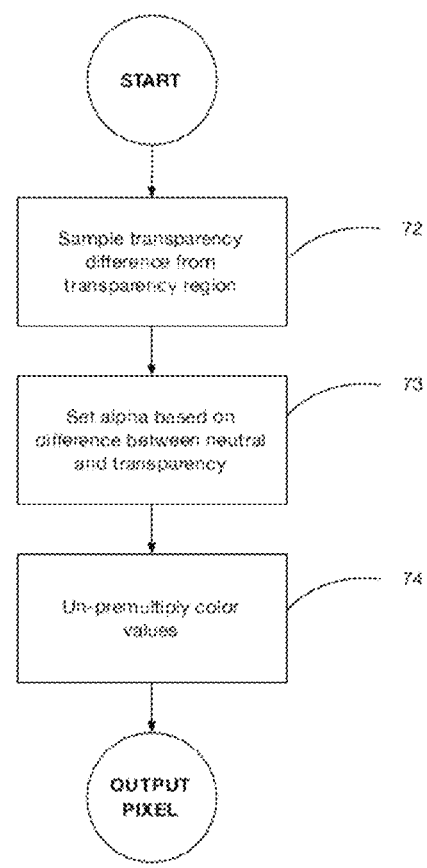
FIG. 9F
FIG. 9E

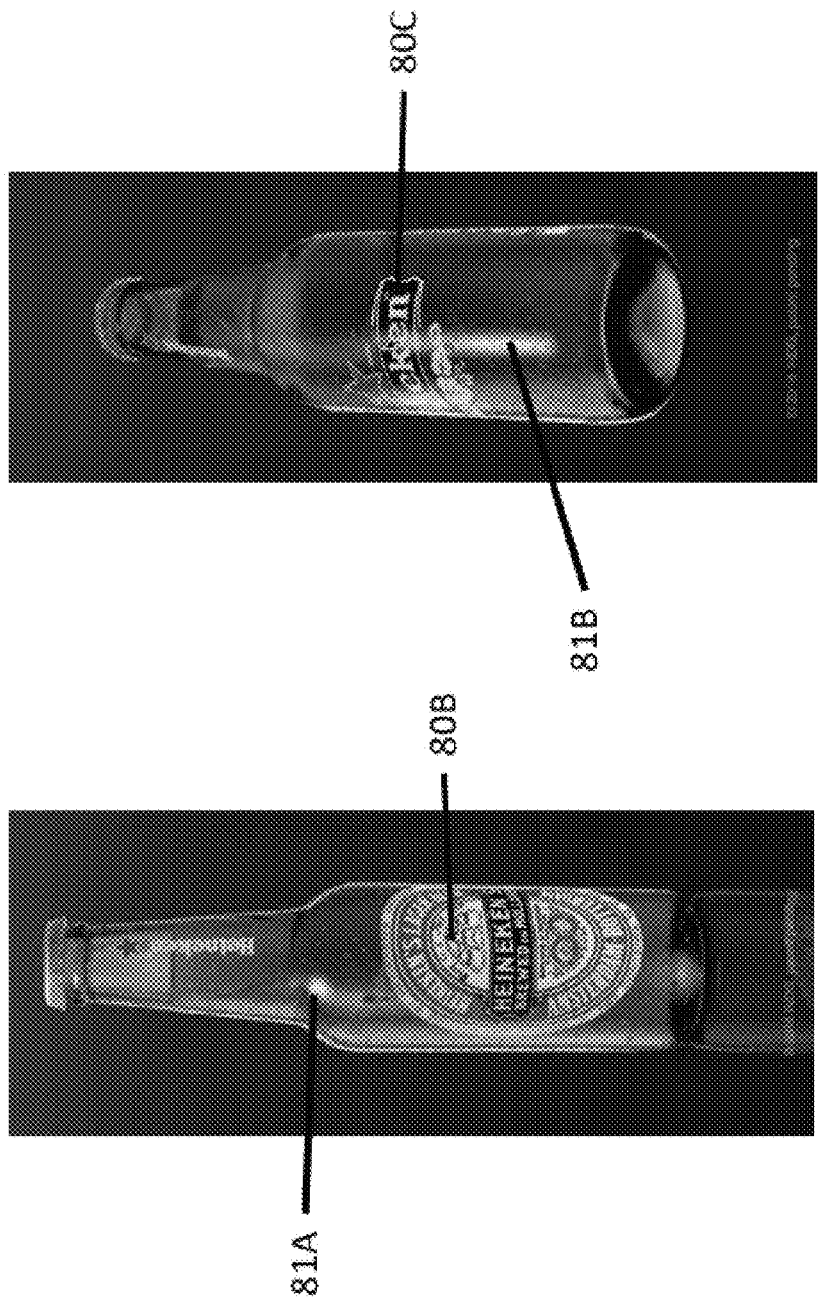

US 9,799,134 B2

METHOD AND SYSTEM FOR HIGH-PERFORMANCE REAL-TIME ADJUSTMENT OF ONE OR MORE ELEMENTS IN A PLAYING VIDEO, INTERACTIVE 360° CONTENT OR IMAGE

This application claims priority from provisional application Ser. No. 62/277,609, filed Jan. 12, 2016, the entire disclosure of which is hereby incorporated by reference.

BACKGROUND OF THE INVENTION

It is often useful and important to be able to showcase rich video, 360° content, images, and/or other types of assets, in the context of a digital configurator. However standard prior art approaches require production of multiple separate assets for each color/pattern combination. Thus, whenever a user interacts with the configurator and makes a change, the standard prior art techniques require reloading an entire new asset from a server or file-system, which makes this approach unsuitable for use in cases where low-latency (immediate results) is a requirement, or where bandwidth for loading additional content from a server is constrained. This is especially true for large product portfolios, where the number of assets that must be created ahead of time becomes problematic in terms of storage (providing storage space for potentially hundreds of different videos), creation time (creating, processing and encoding assets potentially hundreds of times) and delivery (data transfer costs from a server to the consumer). In addition, standard prior art requires all potential colors/patterns, or other configuration combinations of the video to be known ahead of time. Applications allowing for user generated content as input for the configurator typically use low-quality static image previews or require these to be created, processed and encoded on-demand.

SUMMARY OF THE INVENTION

It is therefore an object of the invention to avoid the problems associated with the standard, prior art digital video processing techniques, by providing a method and system for high-performance real-time adjustment of colors and patterns on one or more pre-selected elements in a video, interactive 360° content, image or other asset, in which any surface in the asset can be changed to any color or pattern, and in the case of video, while the video is playing, using high performance GPU code. The image processing pipeline described herein is extremely flexible and allows the use of the same approach for also dynamically and realistically adjusting other aspects in the image, such as reflections, perspective and more. Performance is optimized by generating asset-specific optimized GPU code.

These and other objects and aspects of the present invention will be more fully described with reference to the following drawings and detailed description.

DESCRIPTION OF THE DRAWINGS

The patent or application file contains drawings executed in color. Copies of this patent or patent application publication with color drawings will be provided by the Office upon request and payment of the necessary fee.

FIG. 1 is a block diagram of an asset generation computer and a user computer in accordance with the system and method of the present invention;

FIG. 2C illustrates three intensity-fields in two contiguous rectangles;

FIGS. 4A-4B illustrate an example of an asset in interactive 360° content, along with its metadata mapping lookup table for texture, transparency, reflection and refraction;

FIGS. 6 and 7 are flowcharts illustrating the functionality, structure and method of the video player, implemented on user computer 2, in accordance with the present invention;

FIG. 8 is a flowchart illustrating the functionality, structure and method of the base GPU renderer, implemented on user computer 2, in accordance with the present invention;

FIGS. 9A-9F are flowcharts illustrating the structure and processing, implemented on user computer 2, for various pixel-processing transformations that can be used in the base GPU renderer;

FIGS. 11A-11E illustrate a display of 360° content and examples of adjustments to texture, reflection and refraction based on user-selected patterns, orientations and backgrounds, in accordance with the present invention.

DETAILED DESCRIPTION OF THE INVENTION

With reference to FIG. 1, the hardware associated with various aspects of the present invention will be described. Assets, such as videos, 360° content or images for use with the present invention, are generated at an asset generation computer 1, as will be described in more detail in connection with FIGS. 2A-2C through 5A-5B. The assets are delivered to a user computer 2, typically through a standard Internet connection. The asset generation can be conducted by or on behalf of a company that wishes to provide videos, 360° content or images of certain products using the present invention, and the user can be a prospective purchaser of such products, although it will readily be appreciated that the present invention has wider applicability. The user computer 2 contains a standard CPU 3, and a graphics processing unit, or GPU 4, such as those made by Intel, NVIDIA, AMD or Imagination Technologies, for example, but other GPU's may be used with the present invention as well. The player described in FIGS. 6 and 7 is implemented on the user computer's CPU 3, and the GPU renderer, described in FIGS. 8 and 9A-9F, is implemented on the user computer's GPU 4.

Creation of Assets

Figure 2A:
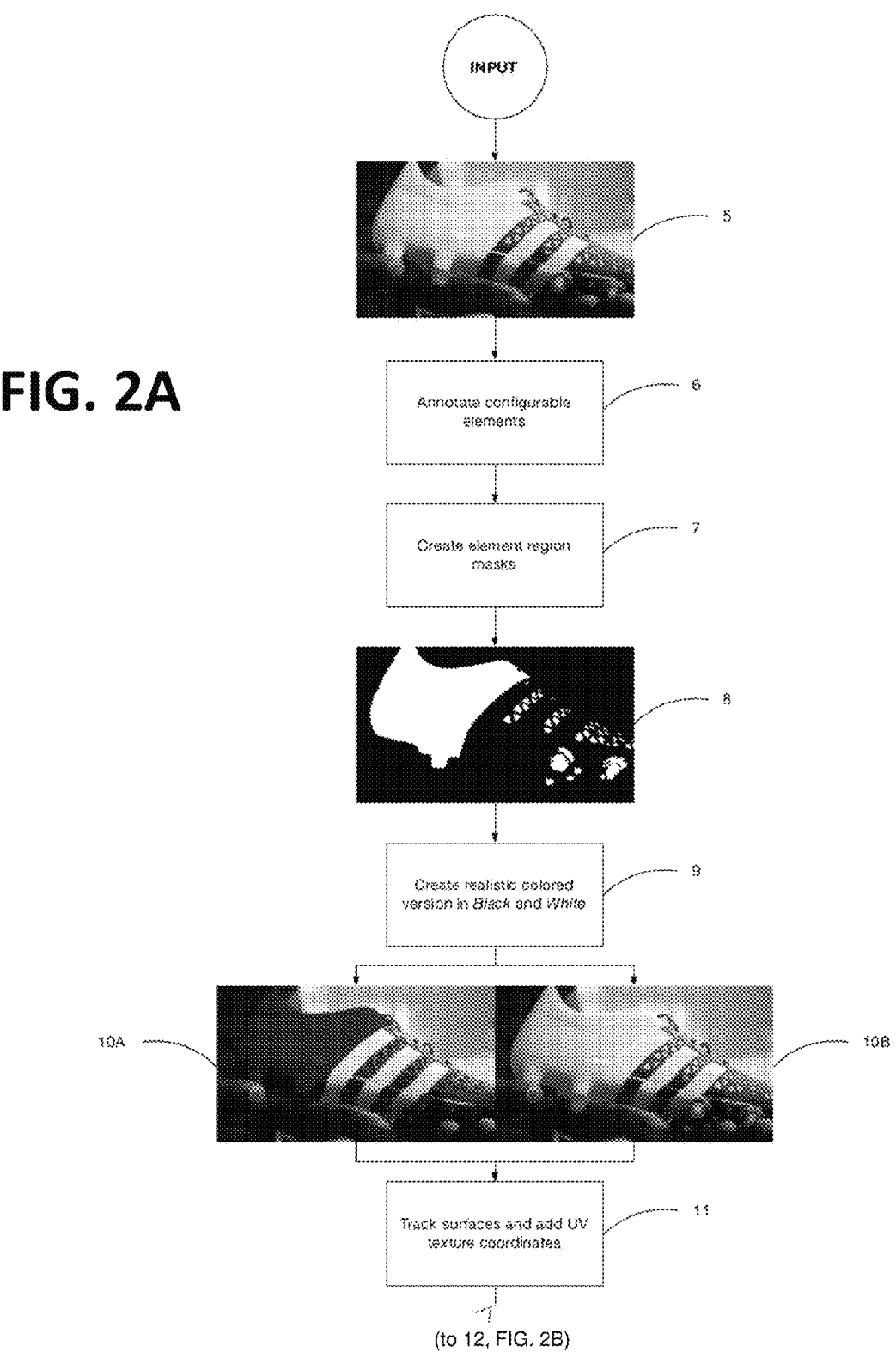
FIGS. 2A-2B show a flowchart illustrating an example of structure and processing implemented on computer 1, for asset production in accordance with the present invention.

The generation of assets, will be explained with reference to the examples shown in FIGS. 2A-2C through 5A-5B. The subject asset 5, FIG. 2A—whether a video, 360° content or an image—is first annotated in block 6 to describe which elements of the asset are to be made configurable through the invention. The annotations are used to process the asset 5 to create masks 7 for the regions that should be modifiable. The masks can be created in many ways, the most practical being through the use of either chroma-keying or rotoscoping. This can be done, e.g., using well-known techniques provided by VFX production companies or specialized software such as Silhouette FX. As a result a new output asset is produced which contains these masks 8. The masks are used to process the subject asset 5 into two asset variations, in particular, realistic versions in black and white in block 9. This can be done, e.g. using well-known techniques provided by VFX production companies or specialized software such as Adobe After Effects. As a result, two new outputs are produced, that are a realistically looking black 10A and white 10B versions of the input asset 5. If the modifiable area of the asset should be able to apply not only a color, but also a pattern, then the surface to which the pattern can be applied is tracked in block 11. This can be done, e.g. again using well-known techniques provided by VFX production companies or planar tracking through specialized software such as Imagineer's Mocha. As a result, a new output asset is produced which contains UV texture coordinates encoded into gradient maps (for example, maps 20F and 20G, FIG. 4A, which will be described in more detail, below). These various asset variants can also be created more easily, and automatically, when the source for them is a 3D (CGI) asset; for example the UV texture coordinates can be exported automatically without requiring manual tracking. UV coordinates are typically encoded in a special cyclical gradient that goes, for example, from black, to red, to white, to blue, to black. The two gradient maps correspond to the U (X) and V (Y) coordinate lookup from the texture containing the pattern to be applied, with the black value corresponding to 0 and 1, red corresponding to 0.25, white corresponding to 0.5 and blue corresponding to 0.75. The black 10A and white 10B variations are then combined in block 12, FIG. 2B, to generate a neutral 14B version and an intensity-field 14C that defines the deviation of that neutral 14B version to regenerate the two black and white extremes, along with a color delta 14D that contains information about how other elements in the scene affect the final color. The various derivatives are then composited in block 13 into a final output asset 14A that contains all the asset variants that are used by the GPU renderer component of the invention (FIGS. 8 through 9A-9F). Asset derivatives that only need a single color channel to represent them are encoded into a single channel and this area of the asset can be combined with other asset derivatives. This allows for example to combine three intensity-fields into a single rectangle on the output asset, by encoding each of them to the R, G and B channels respectively. An example of this is shown in FIG. 2C, where three intensity-fields 14E-G and 14H-J are shown in two contiguous rectangles.

For each asset, a layout metadata file is created in block 15, examples of which are shown in FIGS. 3B-5B. The layout metadata files are used by the player, as will be explained with reference to FIGS. 6 and 7, to generate the optimized GPU code, as will be explained by reference to FIGS. 6 through 9A-9F. The layout metadata file is compressed into a binary file format in block 16 for easy usage with the invention. The layout metadata file describes for each region in the output asset the rectangle (X, Y, width and height) and the channels of the asset that are associated with each configurable region of the subject asset. The layout metadata can be compressed along with other support files used by the player using the binary metadata compression scheme described in the section Compression of Metadata, below.

It should be noted that the majority of assets used with this invention will likely be videos, or 360° content encoded into videos. Videos use compression to optimize file-size; one form of compression used is perceptual compression. Because the human eye sees the color red in less detail, videos typically remove this detail from encoded videos as well, which reduces the detail in the intensity-fields encoded into this channel. Therefore, the present invention preferably uses an adjusted color-spectrum where the R, G and B channels are encoded as Orange, Green, Cyan. This is converted back to R, G and B values again in the GPU renderer at block 42, FIG. 8, as will be described, below.

Compression of Metadata

Both layout metadata and the GPU rendering code templates are stored in binary compressed metadata files. The metadata preferably is stored as binary data in a portable network graphics PNG file to utilize the format's built in ZLib compression. Each grayscale pixel represents a single byte. The grayscale pixel data are stored in the following compressed format:
  1 byte—length of filename
  n bytes—string with filename
  4 bytes—length of data
  n bytes—data In the case of layout metadata there is usually only one file encoded in the output binary in this manner; for the GPU rendering code templates there are multiple files which contain at least a vertex-shader template and a fragment-shader template.

Example Assets

Figure 3B:
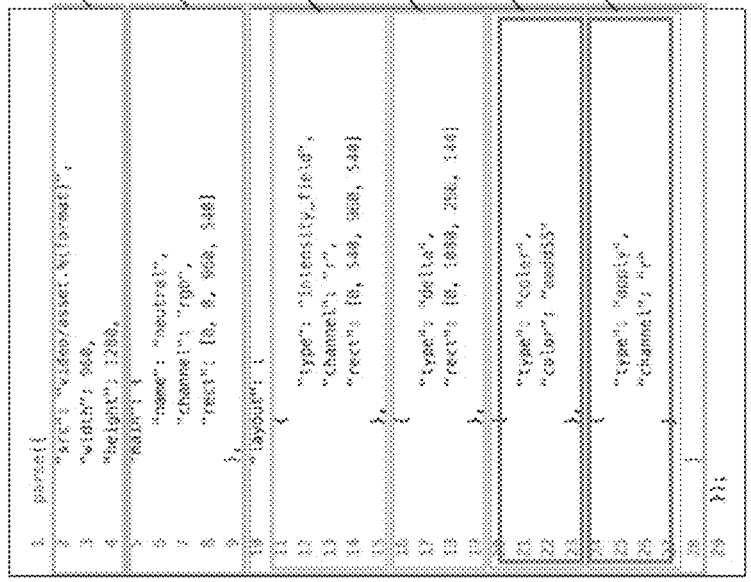
FIGS. 3A-3B illustrate an example of an asset in a playing video, along with its metadata mapping lookup table, showing the main video and corresponding colorizable element masks.
Figure 3A:

Examples of assets produced in accordance with this aspect of the present invention are shown with reference to FIGS. 3A and B through 5A and B. In all examples the lettered elements from FIGS. 3A, 4A and 5A correspond to the lettered sections in FIGS. 3B, 4B and 5B respectively.

FIGS. 3A and 3B illustrate an example of a simple asset where a single region is changeable in color. FIG. 3A illustrates a single frame from the main video layout 18A with a neutral asset 18B, an intensity-field 18C and a color delta 18D. FIG. 3B illustrates the layout metadata file which describes how the main video layout is used by the GPU rendering code to generate the output video. It illustrates the layout metadata file that contains the metadata such as size of the main asset 19A, the size and location of the rectangle dedicated to the neutral asset 19B, the size and location of the rectangle dedicated to the intensity-field 19C, the size and location of the rectangle dedicated to the color delta 19D, and the default color 19E to be applied to the R channel from the intensity-field 19F.

Figure 2B:
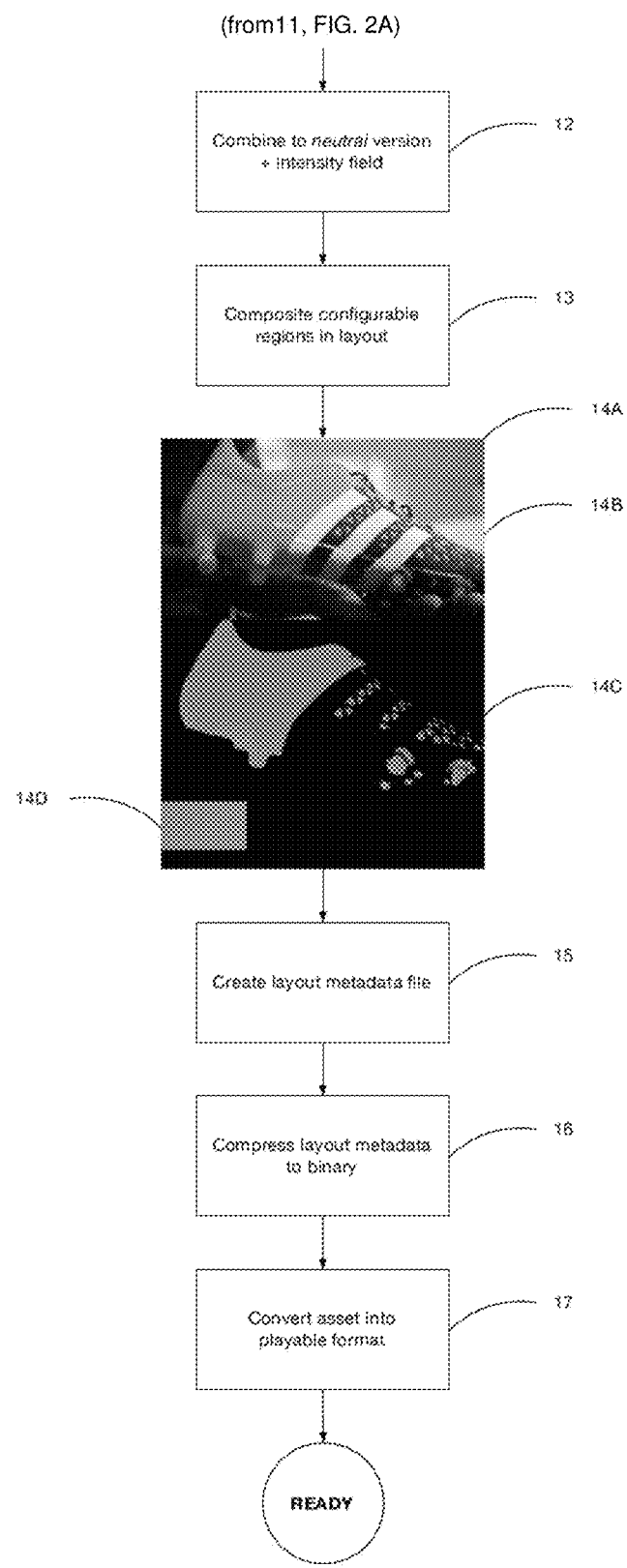

Although FIGS. 2A and 2B describe the production of assets of the type shown in FIGS. 3A-3B, the production of other assets, such as those that are described with reference to FIGS. 4A-4B and 5A-5B will be readily understood by persons of skill in view of the above discussion, and the description of the other assets, as follows.

FIGS. 4A and 4B illustrate an example of a complex asset where a single region is changeable in color, and another region is changeable in pattern, transparency, and reflection and refraction effects. FIG. 4A illustrates a single frame of the main video layout 20A with a neutral asset 20B, a transparency-difference-map 20C which is used to define the transparent areas of the asset, a diffuse layer 20D which is used, e.g., when adding opaque patterns to an otherwise semitransparent object, an intensity-field 20E, UV texture lookup table 20F (horizontal) and 20G (vertical), a pattern mask 20H which is used to constrain the area the texture containing the pattern applies to, a sampling bias 20I that defines the mip-map level to sample the texture containing the pattern from, which results in a level of blurriness in the displayed pattern, and a normal-map 20J that defines the object's surface's direction. FIG. 4B illustrates the layout metadata file which describes how the main video layout is used by the GPU rendering code to generate the output visual. It illustrates the layout metadata file that contains the metadata such as size for the main asset 21A, and the sizes and locations of the rectangles dedicated to the neutral asset 21B, the transparency-difference map 21C, the transparency-difference-map 21D, the intensity-field 21E, the UV texture lookup table 21F and 21G, the pattern mask 21H, the sampling bias 21I, and the object's surface normals 21J. Also included are an instruction to apply a pattern 21K based on the intensity-field's R channel, and a default color to be applied to the G channel of the intensity-field 21L.

It should be noted that not all regions have to be defined at a uniform scale or ratio. The rectangles for the regions can be laid out based on how much precision in those regions are needed for that specific asset. Usually the intensity-field needs a lot of detail, while something like a color delta can be encoded at a fraction of the resolution.

Figure 4E:
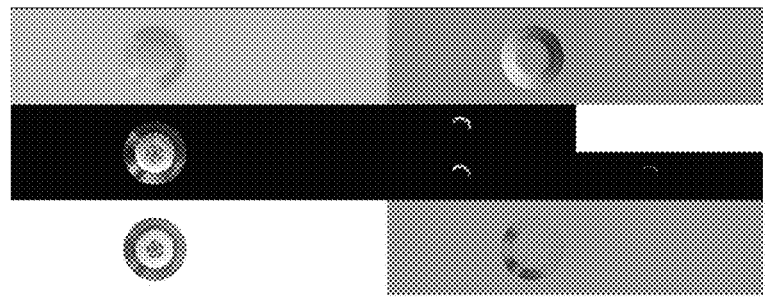
FIGS. 4C-4E illustrate successive video frames of the asset shown in FIG. 4A, showing rotations through two axes.
Figure 4D:
Figure 4C:
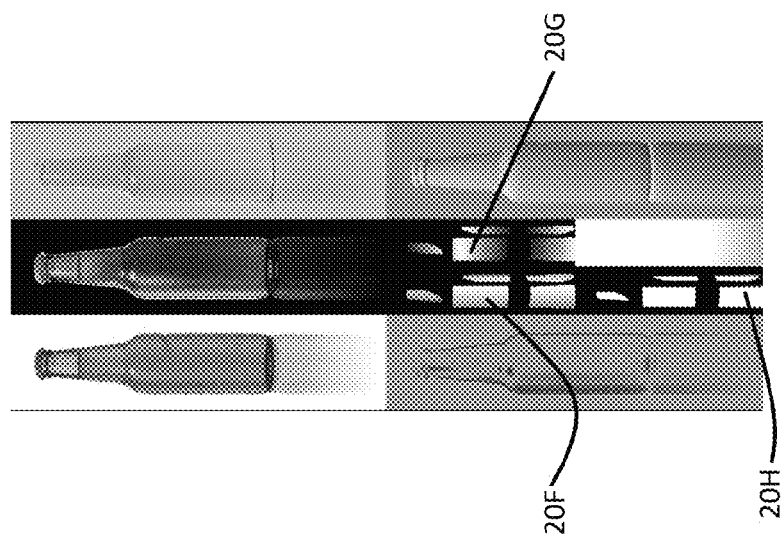

As noted above, FIG. 4A illustrates a single frame of the main video layout 20A. FIGS. 4C-4F illustrate subsequent frames of the main video layout, showing rotations of each of the fields 20B-20J through a first axis of rotation about a vertical line in the plane of the screen, and through a second axis of rotation about a horizontal line in the plane of the screen. In this example, the rotation through the first axis is faster than the rotation through the second axis (a complete rotation through the first axis occurring before any rotation through the second axis takes place), so that only a rotation about the first axis is apparent when comparing FIGS. 4A and 4C. (Only the rotation of fields 20F-H are apparent because of the symmetric nature of the bottle, but all of the fields are actually rotated.) The rotation of the bottle about the second axis is seen in FIGS. 4D and 4E. Thus, all combinations of rotations about the two axes are available so that the bottle may be presented in any orientation depending on user input, as described below, by selecting the specific video frame corresponding to the desired orientation, in a straightforward manner.

Figures 5A, 5B:
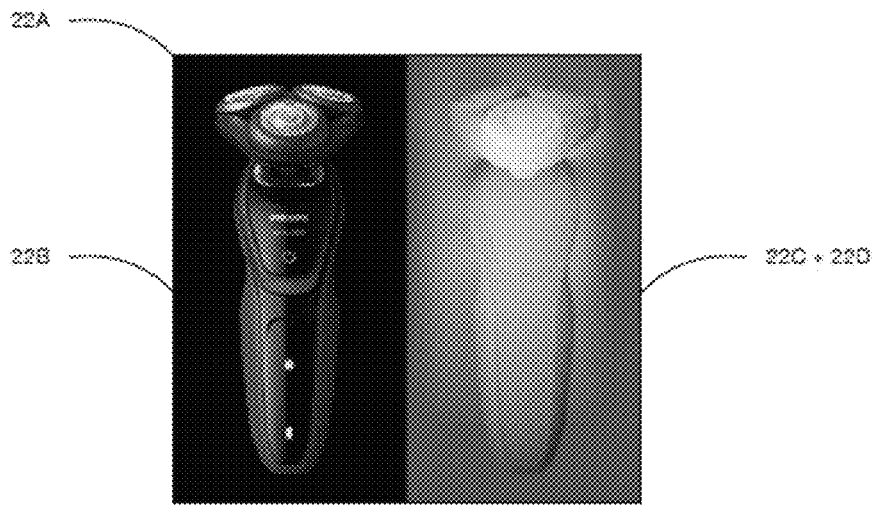
FIGS. 5A-5B illustrate an example of an asset in a video image, along with its metadata mapping lookup table for Z-depth displacement.
Figure 6:
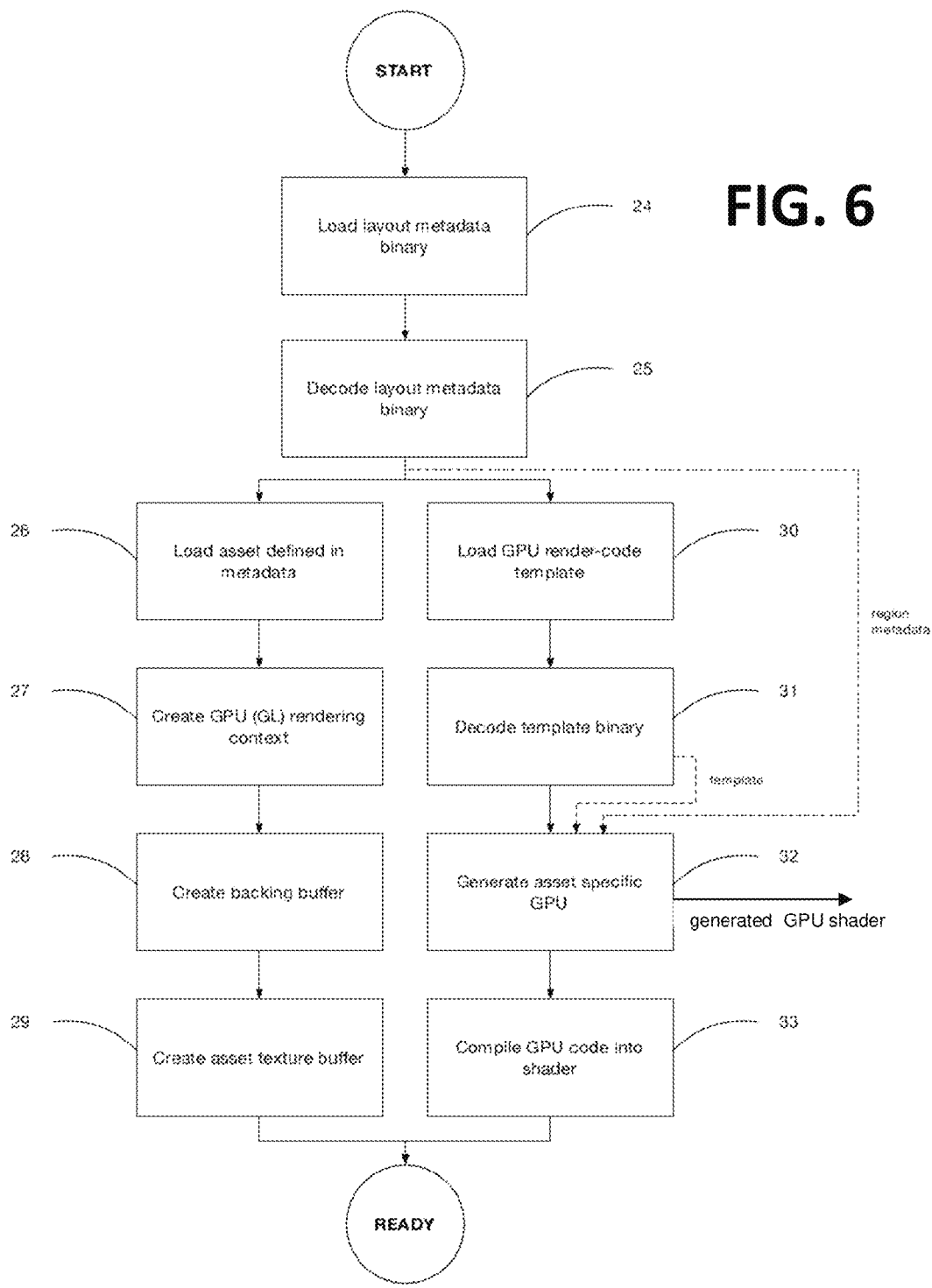

FIGS. 5A and 5B illustrate an example of a simple asset where the perspective of the image is adjusted based on z-depth metadata, and where the image has reflection effects. FIG. 5A illustrates the main video layout 22A with a neutral asset 22B, a normal-map 22C that defines the surface's direction, and a z-depth 22D which defines the distance to the camera. FIG. 5B illustrates the layout metadata file which describes how the main video layout is used by the GPU rendering code to generate the output visual. It illustrates the layout metadata file that contains the metadata such as size, for the main asset 23A, and the locations and sizes of the rectangles dedicated to the neutral asset 23B, the normal-map 23C, and the z-depth 23D.

Asset Player

The system and method for playing the assets in accordance with the present invention, which are implemented on the CPU 3 and GPU 4 in the user computer 2 as shown in FIG. 1, will be described in connection with FIGS. 6 and 7 in the case of the CPU, and FIGS. 8 and 9A-F in the case of the GPU.

The asset player performs a per-pixel processing of each frame of the video and can, e.g. replace the areas within the defined intensity-fields with a new color or pattern. This is done by drawing each video frame to a backing texture buffer which is then rendered onto the screen using GPU shader code that, while rendering, processes each pixel. This per-pixel processing is highly performant because it is executed on the GPU 4 which parallelizes much of the processing, making this possible in real time. In environments where GPU performance is limited, further optimization is achieved by using special GPU code templates to dynamically generate GPU code that is optimized specifically for each asset.

Asset Player—CPU

The CPU portion of the player is shown in FIGS. 6 and 7. In FIG. 6 the player first starts to load the layout metadata binary file, which was produced, for example, at box 16 in FIG. 2, of the asset generator 24. The layout metadata binary is decoded into an internal player data-structure in block 25. Simultaneously two paths are executed: first, the preparation of the asset and any display buffers needed, and second, the generation of the GPU rendering shader code, that is optimized for the specific asset.

With respect to the first path, the layout metadata contains the location of the main asset file which is then loaded in block 26. A GPU rendering context is created in block 27. The rendering context is a standard data-structure in graphics library ("GL") programming which provides access to the textures, shaders and other GPU resources used in the GPU renderer. This context is provided to create or use any resource on the GPU, and is used, for example, to manage texture and buffers. The player creates a backing buffer in block 28 into which all assets are drawn before they are shown on the screen. Then an asset texture buffer is created in block 29 that will contain the current frame of the asset during playback.

Simultaneously, the second path is executed as follows. The GPU render-code templates are loaded from the metadata binary in block 30. The binary is decoded into templates for the vertex-shader and fragment-shader in block 31. The templates along with the region layout metadata, from block 25, are combined into asset specific optimized GPU rendering shader code in block 32. In the code templates, a variety of variables are replaced with parameters that are provided by the rectangles defined in the layout metadata, such as X, Y, width and height, color, default-color, etc. both for the neutral region, and the current template region, as described with reference to FIGS. 3A-B, 4A-B and 5A-B. Various layout regions can have additional parameters that can be replaced with variables from the player, e.g., in the case of an asset with refraction, such as that shown in FIGS. 4A and 4B, this could contain the refraction-index. The generated GPU code starts with a HEADER code template, which sets up internal values for the shader, along with standard setup code for general shader programming. Then each entry in the layout section of the layout metadata file (FIGS. 3B through 5B) is processed in order, and a GPU code template is added based on the type as defined in that region's layout metadata. The generated GPU code then ends with a FOOTER code template, which outputs the final generated pixel to the screen. The generated GPU code is then compiled into a shader that can run on the GPU 33.

In FIG. 7, the player then starts playing back the asset at block 34. For a video this means playing back the video, while for 360° content this means starting to respond to user interactions to change the current frame of the 360° content. The interaction mechanisms and player for the content are well-known in the art, and are typically provided by the operating system or browser in which the present invention would operate. When asset playback starts, the program executes a number of steps in a loop, as follows:

The player checks if the current frame has changed, or if any of the property parameters, such as chosen color or pattern, have changed, in block 35. If not, the system waits, in block 36. If either the frame or the properties have changed, the system first updates the properties in the GPU, in block 37. The CPU 3 and GPU 4 have their own memory areas; thus, when a user uses a user interface ("UI") to modify these properties, these changes initially happen in the CPU 3. In order to use them in the GPU code, they must first be transferred to the GPU 4. Depending on which region types are used a number of properties can be modified:

color; for color changes using an intensity-field
    texture; for pattern changes using a UV gradient, mask, bias and an intensity-field
    position; for perspective changes using a z-depth
    refractionIndex; for refraction effects using a normal-map
    reflectionTexture; for reflection effects based on an environment If the frame of the asset that was created in block 29 in FIG. 6 has changed, the frame is re-drawn to the asset texture buffer in block 38. This is the mechanism that sends the current frame of the asset to the GPU so that it can be used by the GPU render code in the next step. Then the GPU render code is used to render the current frame of the asset along with all the set properties into a final resulting image that is stored into the backing buffer in block 39. Finally, the resulting image is drawn from the backing buffer onto the user's screen in block 40.

Asset Player—GPU

The GPU portion of the player is shown in FIGS. 8 and 9A-9F. The GPU renderer code (generated at block 32, FIG. 6, and executed in compiled form at block 39, FIG. 7) first samples the RGB color value of the neutral region in block 41 and the intensity value from the intensity-field in block 42. Using these values, the original black and white values (10A and 10B in FIG. 2, for example) are recreated, which are used as a light and shadow values for the subsequent calculations in block 43.

For example:

```
light = neutral + intensity / 2.0;
dark = neutral - intensity / 2.0;
```

Figures 9C, 9D:
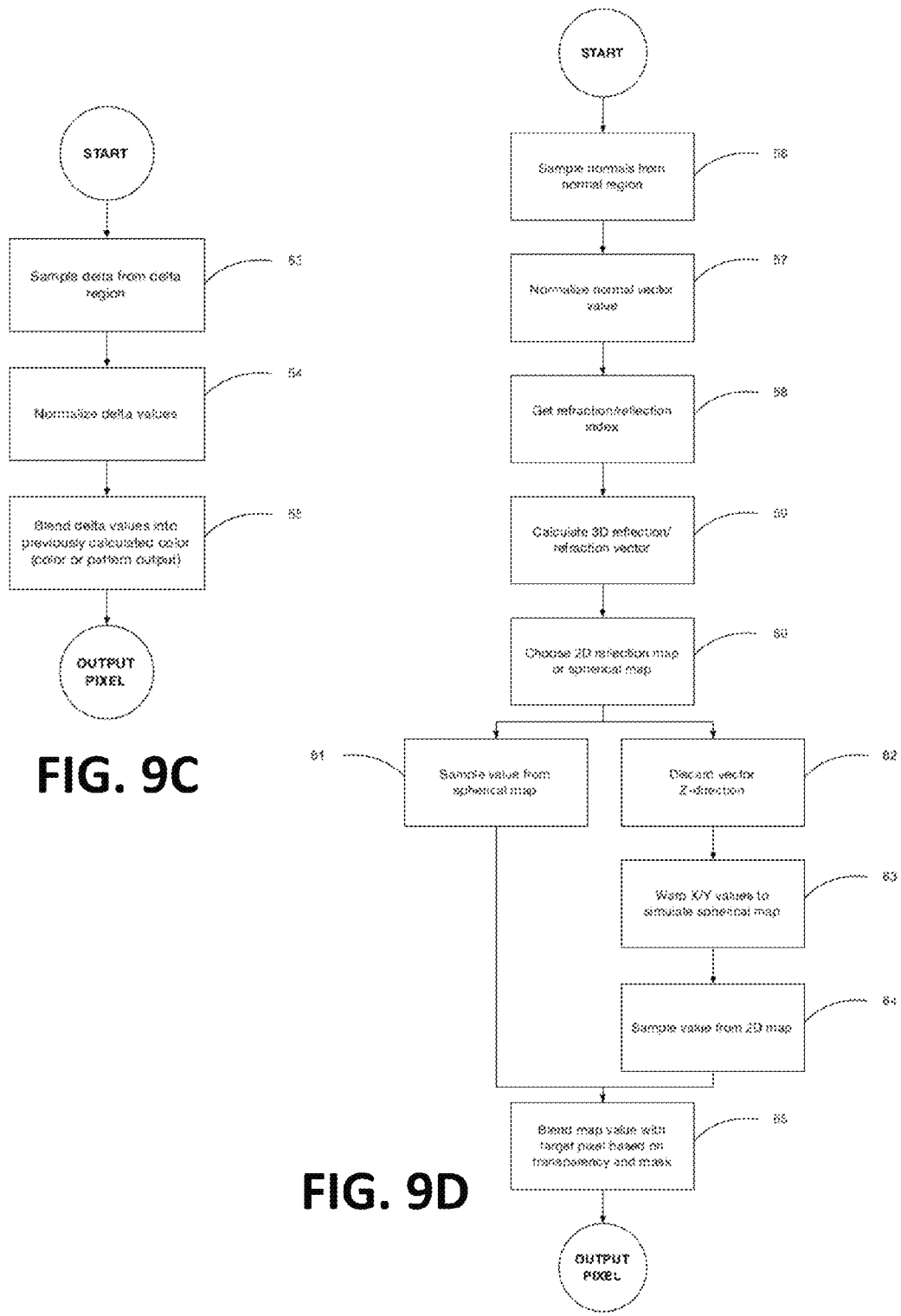
Figure 10A:
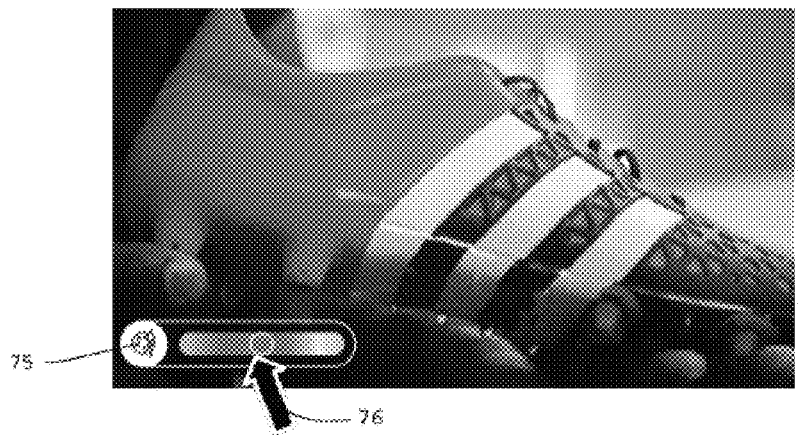
FIGS. 10A-10C illustrate an example of playback of a video allowing real-time adjustment of color in accordance with the present invention.
Figure 10B:
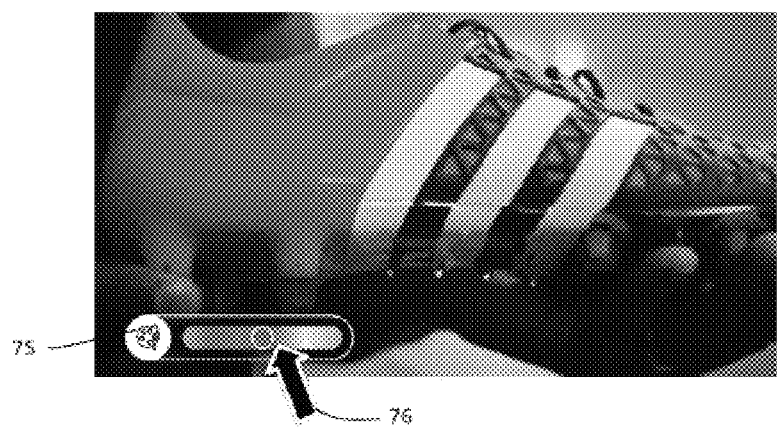
Figure 10C:
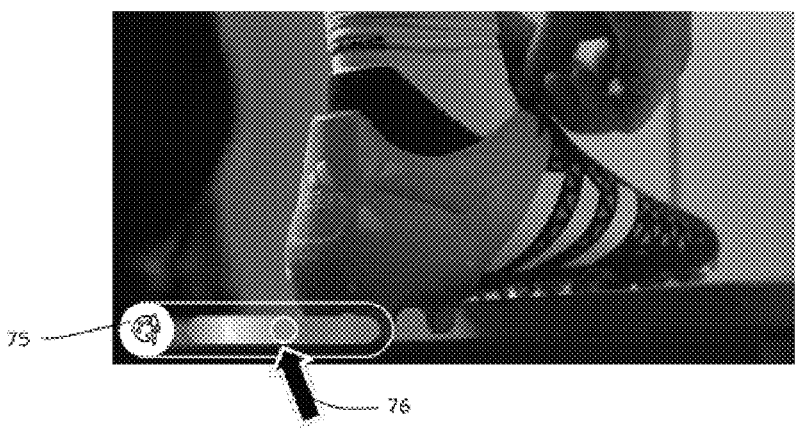

Then depending on the asset layout metadata definition, a number of pixel processing transformations are executed in block 44. The number and types of these pixel processing transformations are extensible. In the present invention six current pixel processing transformations are described:

color; to change color of an element (FIG. 9A)
    pattern; to change a pattern of an element (FIG. 9B)
    delta; to apply color effect of surroundings on an element that was modified in color or pattern (FIG. 9C)
    reflection/refraction; to show reflections or refraction of an environment onto a semi-transparent asset (FIG. 9D)
    z-depth; to displace the pixels of the asset to change the asset's perspective (FIG. 9E)
    transparency; to turn fully opaque assets into semi-transparent assets (e.g., for video that does not support transparency in any of the currently supported formats available in a browser) (FIG. 9F).

It will become apparent, however, that additional processing transformations can be added, as desired, based on the teachings set forth herein.

Most steps result in a new pixel color being calculated. After all processing transformation steps have completed, this new pixel color is rendered onto the backing buffer in block 45. It should be noted that order of the transformation steps is important; applying a color before transparency can result in strange effects because the transparency difference calculations are expected to be done on a neutral version, and a colorized version might cause parts to turn semi-transparent.

Asset Player—GPU—Color

The pixel processing transformation for changing colors is shown in FIG. 9A. The color defined in the layout metadata region property is blended with the light and dark values in block 46, by blending each of the R, G and B components according to the target color, selected by a user of the system through the user interface, as set forth in the following example:

newColor=dark+(light−dark)*vec3(targetR,targetG, targetB)

Asset Player—GPU—Pattern

The pixel processing transformation for changing patterns through a texture image is shown in FIG. 9B. First the UV coordinates are sampled from the two UV gradient regions in block 47 along with the UV mask. The horizontal gradient represents the U (X) coordinate and the vertical gradient represents the V (Y) coordinate. Because the asset is processed in various ways, such as resizing and compressing, the pixels in the asset image can be blended with their surrounding pixels. Because the values in the pixels are interpreted as literal data-values (UV), this blending can cause artifacts in the lookup process. Therefore, a UV mask, defined, for example, by region 20H, FIG. 4A, is introduced to clip the areas that could be affected by this blending, which typically happens around the edges of the region. Then a mip-map bias is sampled in block 48 from the bias region. Images (textures) are typically stored in the GPU's memory at multiple resolutions, called mip-maps. When the image is resized to these different resolutions, it effectively creates a number of different blurred versions of the image in varying degrees of blurriness (different mip-maps). By sampling from the correct mip-map, various blurriness effects can be simulated, such as matching the source image's depth-of-field when applying the pattern. The sampled UV coordinates can be affected by compression artifacts in the processed asset. In order to prevent these compression artifacts from producing visible artifacts in the resulting image—visible as distortions on the pattern texture—these compression artifacts are filtered in block 49. This is done through, e.g., a standard (in video processing) de-blocking filter, and some averaging with neighboring pixels (blurring). Effectively by blurring the image, noise and artifacts can be reduced, at the cost of precision of edges where direction changes, e.g., on objects with sharp corners. Thus, the level of compression filtering is preferably adjusted per asset. Then a linear interpolation based on neighboring pixels is done to improve precision detail in the UV coordinates, in block 50. The asset image can only contain 256 discreet values per channel (R, G and B) and, depending on the compression method used, potentially less, which means no more than 256×256 individual pixels from a pattern texture can be addressed. To solve this, neighboring pixels are used in block 50 to infer this missing precision by smoothening and interpolating the UV coordinates. For example: a sequence of values [0, 0, 1, 2, 2] could be interpolated to [0, 0.5, 1, 1.5, 2].

Then the UV coordinates and mip-map bias are used to sample the pixel from the pattern texture at the chosen coordinates and at the correct mip-map in block 51. Finally the color defined in the pattern texture is blended with the light and dark values by blending each of the R, G and B components according to the target color in block 52, as in the following example:

newColor=dark+(light−dark)*vec3(target$R$,target$G$, target$B$)

Asset Player—GPU—Delta

The pixel processing transformation for applying a color deviation delta is shown in FIG. 9C. First the delta RGB value is sampled from the delta region, such as region 18D, FIG. 3A, in block 53. This delta gives a value per channel of how much that color needs to be added or subtracted from the main color. The delta value (in the range of 0 to 255) is then normalized to a −1 to +1 range in block 54. This delta is then blended per channel into the previously calculated color output in block 55 (as in Asset Player GPU Color or Pattern at blocks 46 and 52, respectively). The calculation takes the calculated color output and blends it to black for a delta value of −1 or white for a delta value of +1:

For example:

```
if (delta > 0.0) {
    newColor = oldColor + (1.0 − oldColor) * delta
} else {
    newColor = oldColor * (1.0 + delta)
}
```

Asset Player—GPU—Reflection/Refraction

The pixel processing transformation for applying reflection and refraction effects is shown in FIG. 9D. First the surface normal value is sampled from the normal region, 20J, FIG. 4A, for example, in block 56. The surface normal describes the X and Y components of a vector perpendicular to the surface of the object in the visual. This surface normal is used to describe the direction of the surface in order to accurately model from which direction light reflects on that surface. The surface normal is assumed to be a vector of length 1. This information is used to infer the Z component and create a normalized normal vector in block 57. From the player user interface, or in a predetermined value, the refraction and/or reflection index for each surface is provided through the player properties at block 37, FIG. 7. If the surface is a refractive surface, the normal vector is used in combination with the refraction index to calculate the refraction direction. Since 3D information about the volume of the object does not exist in the 2D image, simplified assumptions about the object have to be made, by treating it as a lens with a curved back surface (in the direction of the normal vector). This means light passes straight through towards the camera, and only changes direction when it enters the back of the object. To calculate this direction, the inverse Z of the surface normal vector is taken and multiplied by refraction index in block 59. One of the two methods of projecting the environment into the reflection or refraction is chosen in block 60; using a 2D reflection map in blocks 62-64 or a spherical map in block 61.

In the case of the spherical map, the reflection/refraction pixel from the spherical map is sampled based on the calculated 3D vector in block 61.

In the case of the 2D reflection map, the Z component of the vector is first discarded in block 62, since the mapping will be to a flat 2D surface, only the X/Y components are needed. A player property, from block 37, FIG. 7, is then used as a distance estimation of the background plane to the object in the image; this property is entered in the player user interface as the refraction value. This distance estimation is used as a scalar to multiply the X/Y components, and then warped to map it back to the 2D reflection map texture space in block 63.

For example:

```
coord = vec2(normal.x, normal.y)
if (coord.x < 0) {
    coord.x = coord.x * imageCoord.x
} else {
    coord.x = 1.0 − (1.0 − coord.x) * (1.0 − imageCoord.x)
}
if (coord.y < 0) {
    coord.y = coord.y * imageCoord.y
} else {
    coord.y = 1.0 − (1.0 − coord.y) * (1.0 − imageCoord.y)
}
coord = coord + image
```

The pixel from the 2D image coordinate+the refraction/reflection offset coordinate is then sampled in block 64.

Finally, the reflection/refraction color value is composited back into the image in block 65. If the value is a refraction value, the original image color is composited on top of the sampled refraction pixel using the transparency of the original image; if the value is a reflection value, the value is composited on top of the original image using the same blending step using the masks as described in the transformation for color, for example, in block 46, FIG. 9A.

Asset Player—GPU—Z-Depth

The pixel processing transformation for changing the perspective of an asset based on z-depth is shown in FIG. 9E. First parameters are defined for a virtual camera in block 66, which contains primarily the position of the camera in virtual space, and the near and far clipping planes that were used to generate the Z-depth values. These clipping planes define the cut-off planes for where any Z-depth information about the image is expected to exist. The distances of these planes to the camera are provided by properties coming from the configuration, or from the player UI in block 37. The default camera position is at the center of the image, but is offset to create the perspective changes used in this transformation. A technique called ray-marching is then used to trace into the image and find for the given camera transformation which pixel to display. To do this for each pixel a vector is calculated with the direction of the ray to the near-clipping plane normalized to a z-length of 1.

For example:

```
direction = (imageCoord − vec2(cameraCoord)) / near
rayVector = vec3(direction.x, direction.y, 1)
ray = cameraCoord
```

Then the ray is traced into the image in block 67 by taking progressive steps towards image from the camera position, by adding the ray vector to the ray. Then every step we sample the Z-depth from the Z-depth region in block 68 based on the X/Y coordinate of the ray. This Z-depth value is a lightness value that maps between 0 and 1, where 0 is the near-clipping plane, and 1 is the far-clipping plane. The lightness value is mapped to an actual Z-depth value by mapping the 0-1 range value back to the image coordinate space in block 69.

For example:

$$z = sampledZ*(far-near)+near$$

This is repeated until the sampled (normalized) Z value is smaller (closer) than the ray's Z value. If the ray's Z value is higher, it means the image was intersected. The difference between this new X/Y coordinate and the original X/Y sample coordinate is calculated in block 70 which is the distance that pixel's input should be displaced. That displacement is then applied as a vector for all future pixel sampling operations in the various regions (but excluding sampling from external textures such as patterns) in block 71.

Asset Player—GPU—Transparency

The pixel processing transformation for processing transparency in an asset is shown in FIG. 9F. Transparency for a pixel is calculated by taking the lightness difference between the neutral region, and a special transparency region. The neutral region should be on a fully white background, as shown for example in region 20B, and the transparency region on a fully black background as shown for example in region 20C, FIG. 4A. The color value from the transparency region is first sampled in block 72, and the alpha is then calculated.

For example:

```
imageColor.a=distance(imageColor.rgb−transparen-
    cy.rgb)
```

The original color must then be calculated again. Since both the neutral and transparency versions are blended with another color (black or white), some color information is already lost and will result in washed out colors. These colors can be restored by using the color information in the neutral version, subtracting the background information, and dividing by the transparency in block 74.

For example:

```
// vec3(1.0) is a white background
if (imageColor.a > 0.0) {
    imageColor.rgb = (imageColor.rgb − vec3(1.0 − imageColor.a))
        / imageColor.a
}
```

This new image color value is then used for all future processing as the base image color.

Asset Player—GPU—Additional Transformations

It will be appreciated that the pixel transformation methods, systems and structures described above are easily extensible, in view of the foregoing discussion, to include numerous other transformations that may be needed to configure an object in real-time.

In conclusion, the system and method described above allow a user, by simply setting a new property (e.g., the color for a region) in a user interface, to change, in real-time, with no latency, the color or other aspect of the configurable element, without requiring multiple, separate videos for each color/pattern combination, or the reloading of an entire new video from a server. This is demonstrated with reference to the examples shown in FIGS. 10A-10C and 11A-11C.

With reference to FIGS. 3A-3B, 7 and 10A-10C, playback of a video allowing real-time adjustment of color will be described. In this case, playback is commenced, at block 34, FIG. 7, of a video of an asset, namely an athletic shoe, which has been prepared as described in connection with FIGS. 3A-3B. The player displays a user interface 75, FIGS. 10A-10C, in a well-known manner, which allows the user to change the color of the modifiable regions of the shoe, as desired. On a frame by frame basis, video playback is implemented at blocks 35-36, FIG. 7. At block 35, the player checks to see whether the modifiable region has changed based upon the user input of the desired color for the region, based upon the user-controlled cursor, 76, FIGS. 10A-10B. If this is the case, processing proceeds through blocks 37-40, FIG. 7, to update the frame of the playing video, and a new frame is displayed with the selected color, as shown in the sequence of displays in FIGS. 10A-10C.

Thus, by simply moving the cursor 76 of the user interface 75, the color of the configurable region can be changed in real-time, with no latency, in a highly realistic manner, and without requiring multiple, separate videos for each color/pattern combination, or the reloading of an entire new video from a server. Such facility is extremely useful in many applications, for example, in allowing a potential purchaser to view an item in many different colors or styles, or allowing a product designer to develop new products.

Figure 11A:
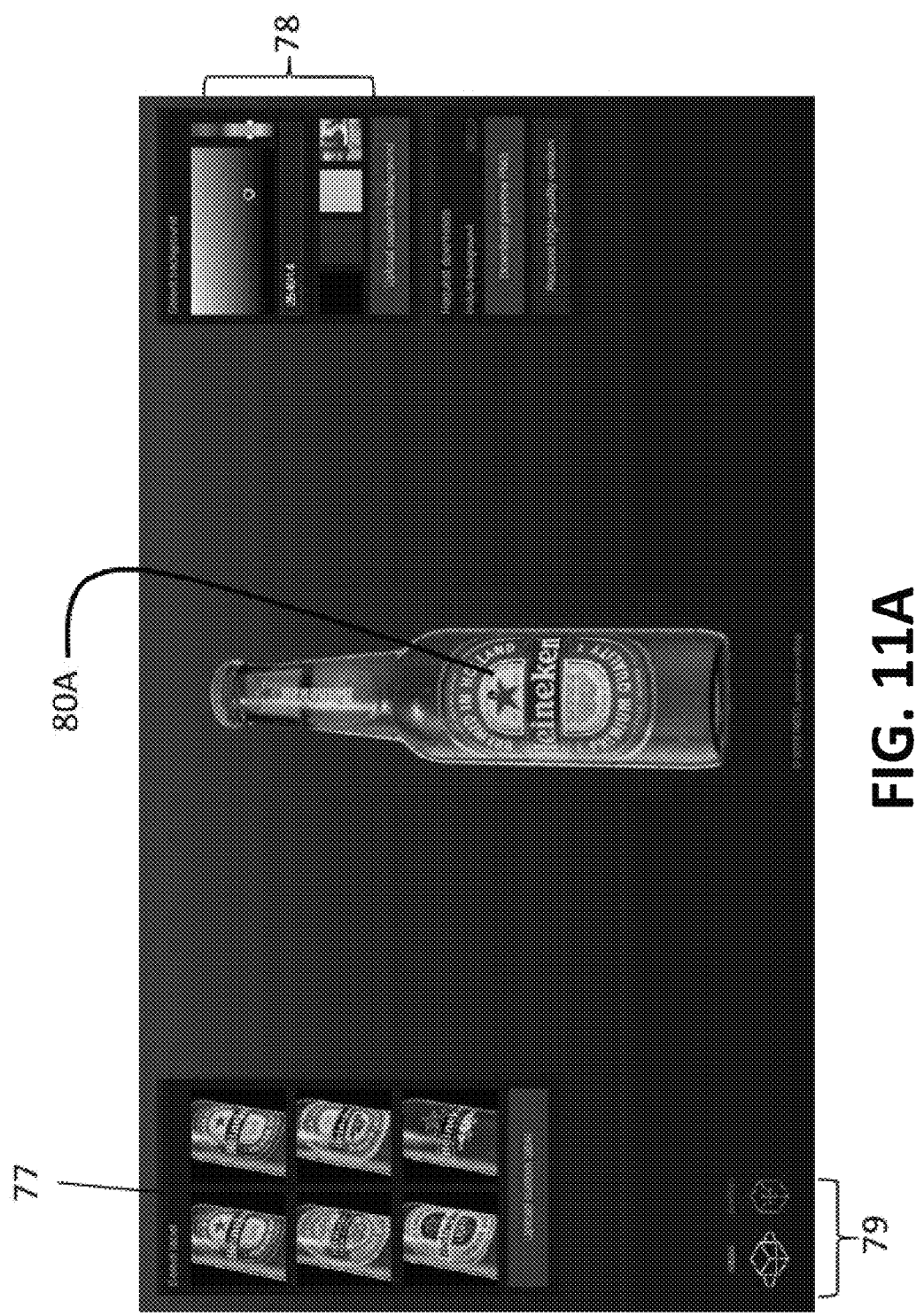
Figure 11E:
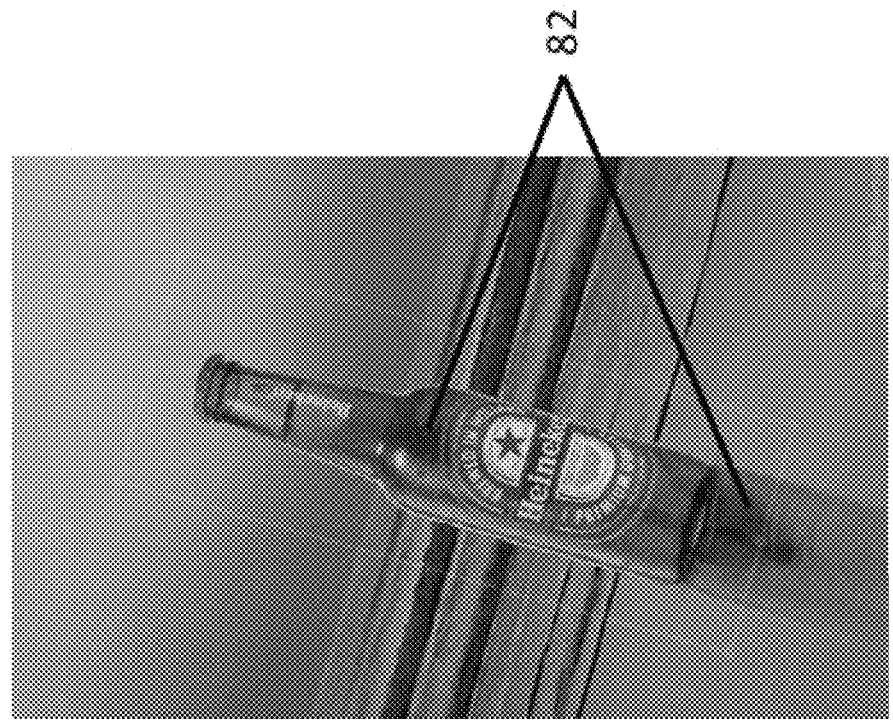
Figure 11D:

Another application of the present invention to the display of 360° content will be described with reference to FIGS. 4A-4B, 7 and 11A-11E. Here, an asset, namely a bottle, is prepared as described with reference to FIGS. 4A-4E. Playback is commenced, at block 34, FIG. 7, and the bottle is displayed within a user interface, an example of which is shown in FIG. 11A. The user interface allows the user to select different patterns or textures (in this case, labels) at input 77. The user interface also allows the user to select different backgrounds and settings at input 78, and different orientations (rotations through the two axes discussed with reference to FIGS. 4C-4E, as well as a rotation through a third axis, normal to the plane of the screen) and positions (translations), at input 79. Unlike the full-frame video described with reference to FIGS. 10A-10C, the display of FIGS. 11A-11E can be static until the user modifies a parameter through the user interface. The player will check to see if such has occurred, in block 35, FIG. 7, and if so, processing proceeds through blocks 37-40, FIG. 7, to update the frame of the display.

For example, the user may select a particular label 80A-80C, at input 77, which will be applied to the region and in the manner specified by regions 20E-20I, FIG. 4A. Further, the user may wish to change the orientation of the bottle at input 79, as shown by comparing FIGS. 11B and 11C. In this case, it will be seen that the reflection characteristics, as defined by the neutral, transparency, diffusion, intensity and normal regions 20A, 20C, 20D, 20E and 20J, as described above, will produce a reflection 81A for the orientation of FIG. 11B, and a different reflection 81B for the orientation of FIG. 11C. This effect is highly realistic and is produced automatically for any orientation selected by the user.

The user can also select different backgrounds and settings for the bottle, essentially to place it anywhere he or she desires. For example, in FIG. 11D, the user has selected a background for the bottle on a beach, and its appearance will be a function of the reflection and refraction characteristics defined by the neutral, transparency, diffusion, intensity and normal regions 20A, 20C, 20D, 20E and 20J, in combination with the background, as described above. This can be compared to FIG. 11E, where the user has translated the bottle, at input 79, so that it obscures the jogger in the selected background. Different refraction effects can be seen at 82, for example, where the jogger and his shadow can be seen as refracted through the semitransparent bottle. Again, this effect is highly realistic and is produced automatically for any background setting selected by the user.

Thus, by selecting combinations of parameters in the user interface shown in FIG. 11A, patterns, orientations and backgrounds can be changed in real-time, with no latency, in a highly realistic manner, and without requiring multiple, separate videos or images for each pattern/orientation/background combination, or the reloading of an entire new video or image from a server. Such facility is extremely useful in many applications, for example, to allow an advertiser or manufacturer to show product placement in unlimited number of settings and arrangements.

Glossary

The terminology used in this specification is intended to conform with standard industry practice; however, to ensure clarity for certain terms used herein, the following glossary is provided.

SAMPLE; to sample in computer graphics means to retrieve the value for a pixel. This is typically done by taking an X/Y coordinate (also often referred to as U/V coordinates) and doing a lookup in a texture what the color value needs to be. Sampling refers to the concept that sometimes multiple "samples" have to be taken to figure out the texture's color value for a given coordinate, as that coordinate can be in between multiple discreet pixel values. E.g., if coordinate (0.5, 0.5) is sampled, the pixels (0.0, 0.0), (1.0, 0.0), (0.0, 1.0) and (1.0, 1.0) would be needed and the values between them interpolated to find the value for (0.5, 0.5).

MIP-MAP; textures are stored on a graphics processor in multiple resolutions, which are called mip-maps. These are normally used to select a different resolution texture based on the size that texture will be displayed on the screen, which is dependent on its distance and scale. When these textures are resized they effectively become differently blurred versions of the high-resolution original. The present invention uses the side-effect of mip-maps as a way to selectively blur some of our transformations to simulate blurriness. E.g., if a pattern is shown on an out of focus area of the asset, the pattern's blurriness should match that of the image. To do so the texture is drawn using a mip-map with that blurriness level.

SHADER; a shader is a computer program that runs on the graphics processor. Typically it is mostly used in 3D graphics to calculate how light affects a 3D object, providing the "shading" of that object. There are a few types of shaders:

fragment shader; this calculates an output color for a give pixel on the screen vertex shader; this calculates a transformation for 3D geometry that is then rendered on-screen with the fragment shader.

The present invention is primarily concerned with the fragment shader as all processing in the present invention is basically 2D in nature and only operates on pixel data.

TEXTURE; a texture is a representation of an image with certain dimensions on the graphics processor's memory GL; stands for Graphics Library and is the suffix used for a collection of similar programming environments used to interface with a graphics processor. Typical examples of this are OpenGL and WebGL.

VEC2/VEC3/VEC4; the types VEC2, VEC3 and VEC4 are used herein to refer to standard vector-types in GL computing.

VEC2 is a 2-dimensional vector (X/Y or U/V)

VEC3 is a 3-dimensional vector (X/Y/Z or R/G/B)

VEC4 is a 4-dimensional vector (X/Y/Z/W or R/G/B/A)

COORDINATES; all 3D coordinates described herein are assumed to describe coordinates that correspond with standard 2D image projection. This means the X direction goes from left to right, Y goes from top to bottom, and Z goes from the camera into the image.

While the preferred embodiments and examples of the invention have been described with reference to the foregoing specification and drawings, the scope of the invention shall now be defined with reference to the following claims.

What I claim is:

1. A method for performing real-time adjustment of at least one pre-selected, frame-based asset originating from video, photography, illustrations or pre-rendered CGI, where said asset is one of (i) a video file, (ii) a 360° asset, (iii) an image, or (iv) interactive content, comprising the steps of:
receiving, for said asset, an asset file having a set of visually encoded input areas with image inputs for at least one transformation to be applied to said asset;
receiving, for said asset, a metadata file associated with said asset (i) describing said at least one transformation to be applied to said asset, and (ii) identifying said input areas to use for said transformation;
receiving, from a user, a target parameter for said asset, which target parameter has not been pre-calculated, said target parameter defining how to affect said transformation;
processing said asset on a per-pixel basis, using graphics processing unit shader code;
performing said transformation to said asset as defined in said metadata file, using said target parameter and said input areas; and
using the result of said transformation to provide a new output image to thereby allow the user to manipulate the asset and view different configurations of said asset in real time.

2. The method of claim 1, wherein said target parameter is a color selected by said user, and further comprising the step of modifying the color of the asset based upon said target parameter.

3. The method of claim 2, further comprising the step of blending pixels into said asset using an intensity-field input area and a source image of said asset containing information about shadows and highlights.

4. The method of claim 3, wherein said asset file includes a texture lookup-table input area that allows for modifying a pattern, said target parameter is a texture selected by said user, and further comprising the step of blending pixels into said asset using said texture selected by said user and said texture lookup-table input area to thus modify said pattern.

5. The method of claim 1, further comprising the step of blending pixels into said asset using a normal input area to calculate light reflection and refraction.

6. The method of claim 1, further comprising the step of blending pixels into said asset using a z-depth input area to displace parts of the image.

7. A method for providing real-time adjustment of at least one pre-selected frame-based asset originating from video, photography, illustrations or pre-rendered CGI, where said asset is one of (i) a video file, (ii) a 360° asset, (iii) an image, or (iv) interactive content, comprising the steps of:
preparing, for said asset, an asset file having a set of visually encoded input areas with image inputs for at least one transformation to be applied to said asset;
preparing, for said asset, a metadata file associated with said asset (i) describing said at least one transformation to be applied to said asset, and (ii) identifying said input areas to use for said transformation;
providing said asset file and metadata file to a user; and
providing for
(i) the receipt, from said user, of a target parameter for said asset, which target parameter has not been pre-calculated, said target parameter defining how to affect said transformation;
(ii) the processing of each asset on a per-pixel basis, using graphics processing unit shader code,
(iii) said transformation to said asset as defined in said metadata file, using said target parameter and said input areas, and
(iv) the utilization of the result of said transformation to provide a new output image to thereby allow the user to manipulate the asset and view different configurations of said asset in real time.

8. The method of claim 7, wherein said target parameter is a color selected by said user, and further comprising the step of providing for the modification of the color of the asset based upon said target parameter.

9. The method of claim 8, further comprising the step of providing for the blending of pixels into said asset using an intensity-field input area and a source image of said asset containing information about shadows and highlights.

10. The method of claim 9, wherein said asset file includes a texture lookup-table input area that allows for modifying a pattern, said target parameter is a texture to be selected by said user, and further comprising the step of providing for the blending of pixels into said asset using said texture selected by said user and said texture lookup-table input area to thus modify said pattern.

11. The method of claim 7, further comprising the step of providing for the blending of pixels into said asset using a normal input area to calculate light reflection and refraction.

12. The method of claim 7, further comprising the step of providing for the blending of pixels into said video asset using a z-depth input area to displace parts of the image.

13. A system for providing real-time adjustment of at least one pre-selected, frame-based asset originating from video, photography, illustrations or pre-rendered CGI, where said asset is one of (i) a video file, (ii) a 360° asset, (iii) an image, or (iv) interactive content, comprising:
an asset file, for said asset, having a set of visually encoded input areas with image inputs for at least one transformation to be applied to said asset;
a metadata file associated with said asset (i) describing said at least one transformation to be applied to said asset, and (ii) identifying said input areas to use for said transformation;
a user interface for receiving a target parameter for said asset, which target parameter has not been pre-calculated, said target parameter defining how to affect said transformation; and
a central processing unit (CPU) and a graphics processing unit (GPU) (i) receiving said asset file, said metadata file and said target parameter, (ii) processing said asset, on a per-pixel basis, using shader code, a (iii) performing said transformation to said asset as defined in said metadata file, using said target parameter and said input areas, and (iv) using the result of said transformation to provide a new output image to thereby allow the user to manipulate the asset and view different configurations of said asset in real time.

14. The system of claim 13, wherein said target parameter is a color, and wherein said CPU and GPU modify the color of said asset based upon a color received at the user interface.

15. The system of claim 14, wherein said CPU and GPU blend pixels into said asset using an intensity-field input area and said source image of said asset containing information about shadows and highlights.

16. The system of claim 15, wherein said asset file includes a texture lookup-table input area that allows for modifying a pattern, said target parameter is a texture received at the user interface, and wherein said CPU and GPU blend pixels into said asset using said texture and said texture lookup-table input area to thus modify said pattern.

17. The system of claim 13, wherein said CPU and GPU blend pixels into said asset using a z-depth input area to displace parts of the image.

18. The system of claim 13, wherein said CPU and GPU blend pixels into said asset using a normal input area to calculate light reflection and refraction.

19. A system for providing real-time adjustment of at least one pre-selected, frame-based asset originating from video, photography, illustrations or pre-rendered CGI, where said asset is one of (i) a video file, (ii) a 360° asset, (iii) an image, or (iv) interactive content, comprising:
an asset file, for said asset, having a set of visually encoded input areas with image inputs for at least one transformation to be applied to said asset;
a metadata file associated with said asset (i) describing said at least one transformation to be applied to said asset, and (ii) identifying said input areas to use for said transformation;
a user interface for receiving a target parameter for said asset, which target parameter has not been pre-calculated, said target parameter defining how to affect said transformation; and
processing means for (i) receiving said asset file, said metadata file and said target parameter, (ii) processing said asset, on a per-pixel basis, using graphics processing unit shader code, (iii) performing said transformation to said asset as defined in said metadata file, using said target parameter and said input areas, and (iv) using the result of said transformation to provide a new output image to thereby allow the user to manipulate the asset and view different configurations of said asset in real time.

20. The system of claim 19, wherein said target parameter is a color, and wherein said processing means modifies the color of said asset based upon a color received at the user interface.

21. The system of claim 20, wherein said processing means blends pixels into said asset using an intensity-field input area and said source image of said asset containing information about shadows and highlights.

22. The system of claim 21, wherein said asset file includes a texture lookup-table input area that allows for modifying a pattern, said target parameter is a texture received at the user interface, and wherein said processing means blends pixels into said asset using said texture and said texture lookup-table input area to thus modify said pattern.

23. The system of claim 19, wherein said processing means blends pixels into said asset using a z-depth input area to displace parts of the image.

24. The system of claim 19, wherein said processing means blends pixels into said asset using a normal input area to calculate light reflection and refraction.

* * * * *